(12) United States Patent
Collie et al.

(10) Patent No.: US 6,269,377 B1
(45) Date of Patent: Jul. 31, 2001

(54) SYSTEM AND METHOD FOR MANAGING LOCATIONS OF SOFTWARE COMPONENTS VIA A SOURCE LIST

(75) Inventors: Robert C. Collie, Redmond; John C. Delo, Bellevue; Malcolm S. Haar, Seattle; David E. Gonzalez, Issaquah, all of WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/157,974

(22) Filed: Sep. 21, 1998

(51) Int. Cl.[7] .................................................. G06F 17/30
(52) U.S. Cl. ...................... 707/103; 707/101; 707/102; 707/104; 707/203; 707/205
(58) Field of Search ................................. 707/101, 103, 707/104, 201, 202, 203, 204, 205, 206

(56) References Cited

U.S. PATENT DOCUMENTS

| | | | |
|---|---|---|---|
| 5,355,497 | * 10/1994 | Cohen-Levy | 395/700 |
| 5,371,885 | * 12/1994 | Letwin | 395/600 |
| 5,870,756 | * 2/1999 | Nakata et al. | 707/200 |
| 5,909,542 | * 6/1999 | Paquette et al. | 395/200 |
| 5,915,116 | * 6/1999 | Hochman et al. | 395/705 |
| 5,926,756 | * 7/1999 | Piosenka et al. | 455/418 |
| 6,098,072 | * 8/2000 | Sluiman et al. | 707/103 |

OTHER PUBLICATIONS

Kelly, M., "Gain Control of Application Setup and Maintenance with the New Windows Installer", Microsoft Systems Journal: Sep. 1998, pp. 15–27.

* cited by examiner

Primary Examiner—Thomas Black
Assistant Examiner—Thuy Do
(74) Attorney, Agent, or Firm—Christensen O'Connor Johnson Kindness

(57) ABSTRACT

A system and method for managing locations of software components via a source list. The needed software components are identified. A list of source locations is referenced repeatedly until a valid source location is found or until each source location on the list has been referenced. If a valid source location is found, the software components are retrieved from that source location. New source locations may be added to this list of source locations when the user identifies these new source locations. A list of source locations is continually maintained.

21 Claims, 4 Drawing Sheets

SYSTEM AND METHOD FOR MANAGING LOCATIONS OF SOFTWARE COMPONENTS VIA A SOURCE LIST

RELATED APPLICATIONS

This application is related to the following applications, all of which are filed on the same day and assigned to the same assignee as the present application: "Use of Relational Databases for Software Installation," Ser. No. 09/158,125; "System and Method for Repairing a Damaged Application," Ser. No. 09/158,126; "Method and System for Restoring a Computer to its Original State After an Unsuccessful Installation Attempt," Ser. No. 09/158,124; "A Method for Categorizing and Installing Selected Software Components," Ser. No. 09/157,695; "Method for Optimizing the Installation of a Software Product onto a Target Computer System," Ser. No. 09/157,853; "Software Installation and Validation Using Custom Actions," Ser. No. 09/157,776; "Internal Database Validation," Ser. No. 09/157,828; "Management of Non-persistent Data in a Persistent Database," Ser. No. 09/157,883; "Method and System for Advertising Applications," Ser. No. 09/158,967; "Software Implementation Installer Mechanism," Ser. No. 09/158,021.

TECHNICAL FIELD

The present invention generally relates to computer systems and computer software. More particularly, the present invention relates to computer systems and computer software that enable software components to be retrieved from a variety of sources.

BACKGROUND OF THE INVENTION

Before an application program can first be used, it must typically be installed onto a computer system. The installation procedure generally involves copying executable and data files (the "program files") relating to the application program from a source location to an installed location on the computer. Typically, the source location is an installation disk or location on a network server accessible by the computer system. Often the program files are stored in a compressed format to conserve storage space.

Before proceeding further, a brief discussion of terminology is needed. The installer application described herein recognizes three principal elements: products, features and components. A "product" represents a single, entire application program, such as the Microsoft Office application program marketed by Microsoft Corporation of Redmond, Wash. Each product has a globally unique identifier known as a Product Code, which allows products to be distinguished. Each product is made up of one or more features. A "feature" is a module that a user may choose to install or execute. Features typically correspond roughly to the functional features of the product itself, such as a "Proofing Tools" feature or a "Word" feature. Each feature is essentially a grouping of components and may also include other features. For example, the "Word" feature may include the "Proofing Tools" feature, and the "Proofing Tools" feature may include a "Spell Check" feature. So a feature, which is a module of a product, can also have its own features. Features need not be globally unique and therefore may be identified by any appropriate means, such as with a textual feature identifier.

A "component" is a collection of files, registry keys, and other resources that are all installed or uninstalled as a unit. Components are the building blocks of the product that are not exposed to the user. A resource, such as a file or a registry key, may be part of only one component. Two components may not share the same resource, whether they are part of the same product or parts of different products. Each component has a globally unique identifier known as a Component Code. One resource within the component is designated as a "key file." The existence of the key file is used by an installer as an expedient means of checking whether a component is correctly installed or not. The installer only verifies the existence of the key file, unless a problem arises. If a problem arises, then the installer will perform a more extensive check of the files. The key file may be any resource, such as a file or registry key, within the component. A list of sources for installing a desired component is stored in a source list key.

Application programs use a variety of installation technologies to copy the program files from the source location to the computer system. InstallShield, Seagates' WinInstall or Great Lakes Software's Wise Installation System are tools commonly used for generating application installation packages for Microsoft Corporation's Windows platforms. Web-based components such as ActiveX controls may use IExpress packages, which are selfextracting executables with a simple file copy and registry capability.

An application program will often include a special application program (the "set-up program") for administering and performing the installation procedure. Generally, the set-up program is unique to the application program and is customized to install the program files from a predetermined source location to pre-configured locations on the computer system. Often the user is provided the option of redirecting the installation of the program files to other locations on the computer system.

The typical set-up program, such as the one currently provided by Microsoft Windows, not only installs the program files to the computer system but also creates entries in a central registration database, such as a system registration database (the "system registry"), which identify the locations of the program files on the computer system. The location may be identified by a "path" to a particular directory or folder of the computer system in which the program files reside. The system registry is typically maintained by the computer system's operating system. While executing, the application program generally queries the operating system for the path to an installed program file, the operating system looks up the path in the system registry, and the operating system returns the path to the executing application program.

This set-up program provides only a very rudimentary way for system administrators and users to know which applications they have installed on their machines and to manage these installed applications. The operating system for Microsoft Windows contains an "Add/Remove Programs" control panel, and this control panel is driven by a standard set of registry entries. Windows 95, Windows 98 and Windows NT 4.0 can uninstall a product by invoking a command line provided by this registration information. Products such as Microsoft Systems Management Server can help manage installed applications in a centrally-managed environment. However, these products are limited by the information and control that individual application setup scripts choose to provide, and they do not facilitate source management for users who are in effect their own system administrators.

A limitation of current installation technologies is that they look for the program files at a predetermined location.

Current installation technologies will not perform satisfactorily if that location is not available. For example, users frequently install software over a network. The installer software will look for the needed program files at a predetermined location, usually a server. If the server goes down while a user is installing these program files from the network, the user is unable to install the desired program files and is without recourse. Similarly, if the installer software expects to find the needed program files on removable media, and the removable media is not mounted when the software installer needs these program files, the installation will fail. Even something as simple as the expected program file having been inadvertently erased from the expected location will bring the software installation process to a halt.

Typically, the Add/Remove Program control panel is used to invoke "maintenance mode" setup for a product. For example, if the user decides that he now wants to install the Spell Check feature though he chose not to do so during the original install, the user goes to the Add/Remove control panel and re-runs the setup procedure to install the Spell Check feature. Depending on the user interface of the particular program, if the original installation source is no longer available, the application will either fail or will interrupt the installation process to prompt the user to locate a valid source manually. The user would either have to find a new source, or the install would fail.

When a user installs a product, he may select all of the product's features to run from the network. If the network goes down, the user is unable to use the product's features because the "run-from-source" features could run only from the network source. Users and administrators want a system by which the installer will go to a back-up location to get the needed modules if the network server goes down. This can be done via a distributed file system (DFS). A DFS keeps track of files stored across multiple networks. It converts file names into physical locations. However, everyone does not have access to a DFS, and even where a DFS is available, the administrator must manually re-map the file system before the software installer will look in an alternate location.

The problem of finding a valid source location for a computer program file can arise in a number of different situations: when the product is first installed, when an installed product is reconfigured, or when a product is configured to "run-from source". Each of these situations will now be briefly described.

With the typical initial installation procedure the user will mount a CD or access a network share and click on the "install" executable. Finding a valid installation source is typically not much of an issue in this situation, since the user would not have been able to invoke the "install" executable if the installation source were not available. However, under certain circumstances it is possible to initiate an original install other than from an install executable at the source location, for example, from the Add/Remove control panel of Microsoft Windows. The installation software will look to a predetermined source location for the needed software code, and if the source location is not available, the installation will fail.

Subsequent to the original installation of the product, occasions may arise when the user needs to perform additional installations. For example if the user originally did not install the spelling checker but subsequently decided this feature was needed, the user would need to install this feature. In the case of Microsoft Windows software the user can access the Add/Remove control panel to invoke "maintenance mode" setup for a product. The Add/Remove control panel looks to the source from which the original installation was performed. If the source from which the program was originally installed is unavailable, then the user either has to find a new source manually or the install will simply fail.

As an alternative to the Add/Remove control panel, certain applications may install software "on demand." "On demand" installation is really just an automated form of "maintenance mode" installation. When the user selects the spelling checker from, for example, the word processing application, and the selected feature had not previously been installed, the application can automatically install the requested feature. If the original installation source was not available at the time the "on demand" installation is attempted, an alternate source must be located or the installation will fail.

The need to find a valid source location can also arise in circumstances unrelated to installation. For example it is possible for a user to install a product from a network location and configure all of the features to run from the network, rather than having the features installed on the user's local hard drive. When the features are configured to "run from source" and the network then goes down, the features cannot run.

In all of these instances there is a need for a method and software product which will look for alternate source locations in the event that a primary source location is unavailable.

SUMMARY OF THE INVENTION

Stated generally, the present invention relates to a method for reading a computer program file which will look in alternate locations for the computer program file if the file is not in its expected location. The method is thus not dependent upon the computer file being located in a particular source location and is also not dependent upon the source location being found.

Stated somewhat more specifically, the present invention relates to a method of reading a computer program file. The method first looks for the computer program file in a first source location. If the computer program file is not found in the first source location, or if the first source location cannot be found, the method repeatedly references a list of source locations of the computer program file and looks for the computer program file in each of the source locations on the list in turn until either the computer program file is found or until each source location on the list has been referenced. If the computer program file is found, the computer program file is read from the corresponding source location. According to one embodiment of the invention, the computer program file, once read, is copied at least in part to a computer readable medium, such as the user's local hard disk drive. According to another embodiment the computer program file, once read, is executed, such as in the case of a feature of an application program which is configured to "run from source."

In the disclosed embodiment the list of source locations for the software components is searched in an ordered sequence that is defined by either the system administrator or the user. This ordered sequence is defined such that network source locations, media source locations, and Internet site source locations are categorized in different groups and are then ordered within each group. The installer application remembers the last-used source location. If a valid source location has not been found by the software installer after first referring to the last-used source location and then, if necessary, to each source location on the list, the software installer may prompt the user to identify a new source location. This user prompt can optionally be enabled or disabled by the system administrator. Also, if the user interface level of the install is set to none, no source dialog is displayed to prompt the user to identify a new source location.

Another aspect of the present invention relates to a method of adding a new source location to the source list. The software installer maintains a list of source locations and detects when a new source location has been identified by a user. The software installer then determines whether the new source location is already on the list of source locations. If the new source location is not on the list of source locations, the software installer adds the new source location to the list. In the disclosed embodiment the installer maintains a comprehensive list of source locations, which consists of network source locations, media source locations, and Internet site source locations. The installer application remembers the last-used source location and replaces the last-used source location with a new source location. If it is determined that the new source location is a media source location, this media source location is not added as a new source location to the list of source locations.

Another aspect of the present invention comprises a computer system containing code for carrying out the aforementioned methods. Yet another aspect of the present invention comprises a computer readable medium that contains instructions for carrying out the aforementioned methods.

DETAILED DESCRIPTION OF THE INVENTION

Reference is now made to the drawings, in which like numerals indicate like elements throughout the several views.

Exemplary Operating Environment

Figure 1:
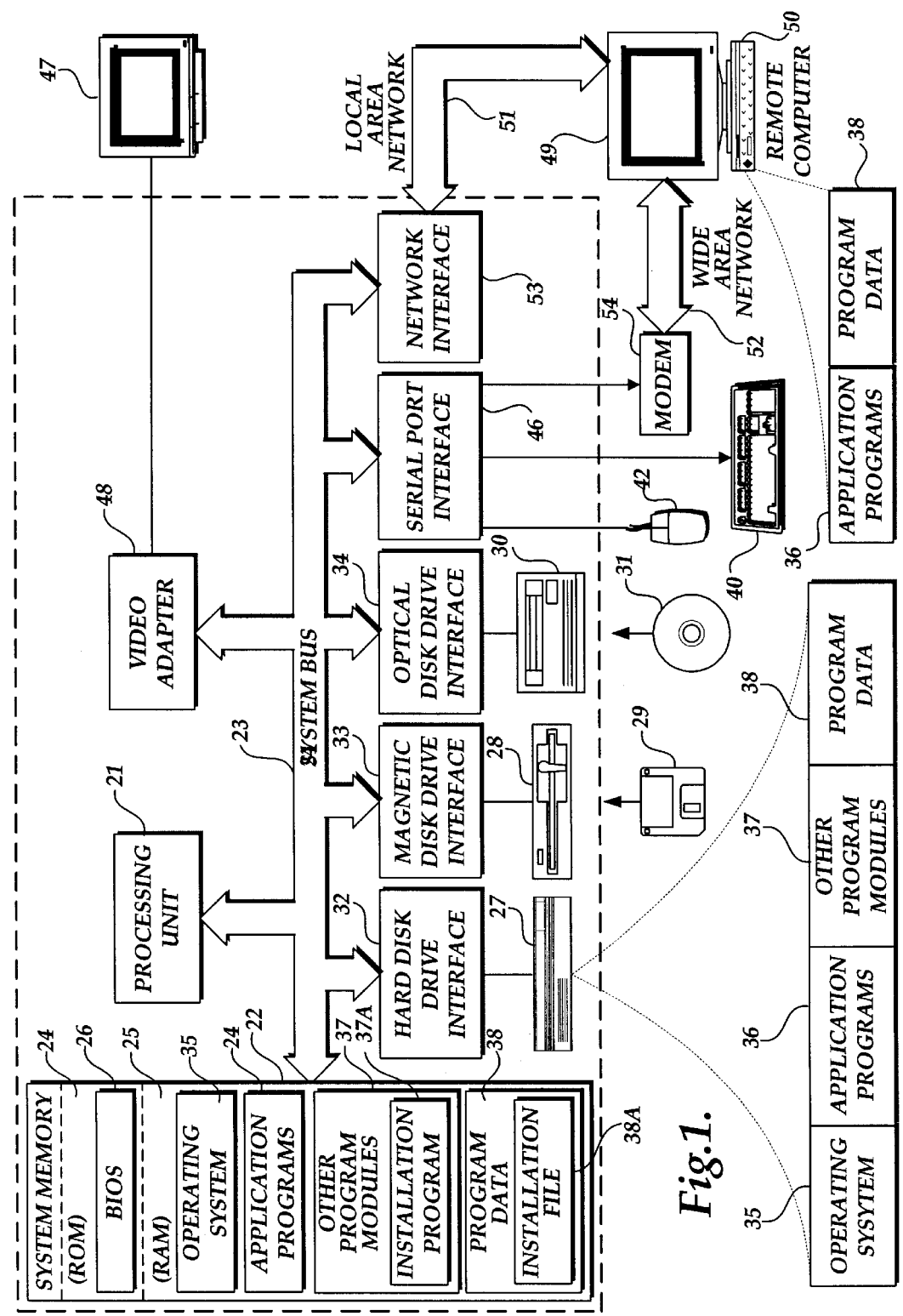
FIG. 1 is a block diagram of a computer that provides a portion of the operating environment for an exemplary embodiment of the present invention.

FIG. 1 and the following discussion are intended to provide a brief, general description of a suitable computing environment in which the present invention may be implemented. Although not required, the invention will be described in the general context of computer-executable instructions, such as a program module or file, running on a personal computer. Generally, program modules include routines, programs, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory 22 to the processing unit 21. The system memory 22 includes read only memory ("ROM") 24 and random access memory ("RAM") 25. A basic input/output system 26 ("BIOS"), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35; one or more application programs 36, other program modules, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus ("USB"). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a hard disk drive 50 has been illustrated in FIG. 1. The logical connections depicted in FIG. 1 include a local area network ("LAN") 51 and a wide area network ("WAN") 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Example of Installation Procedure

Figure 2:
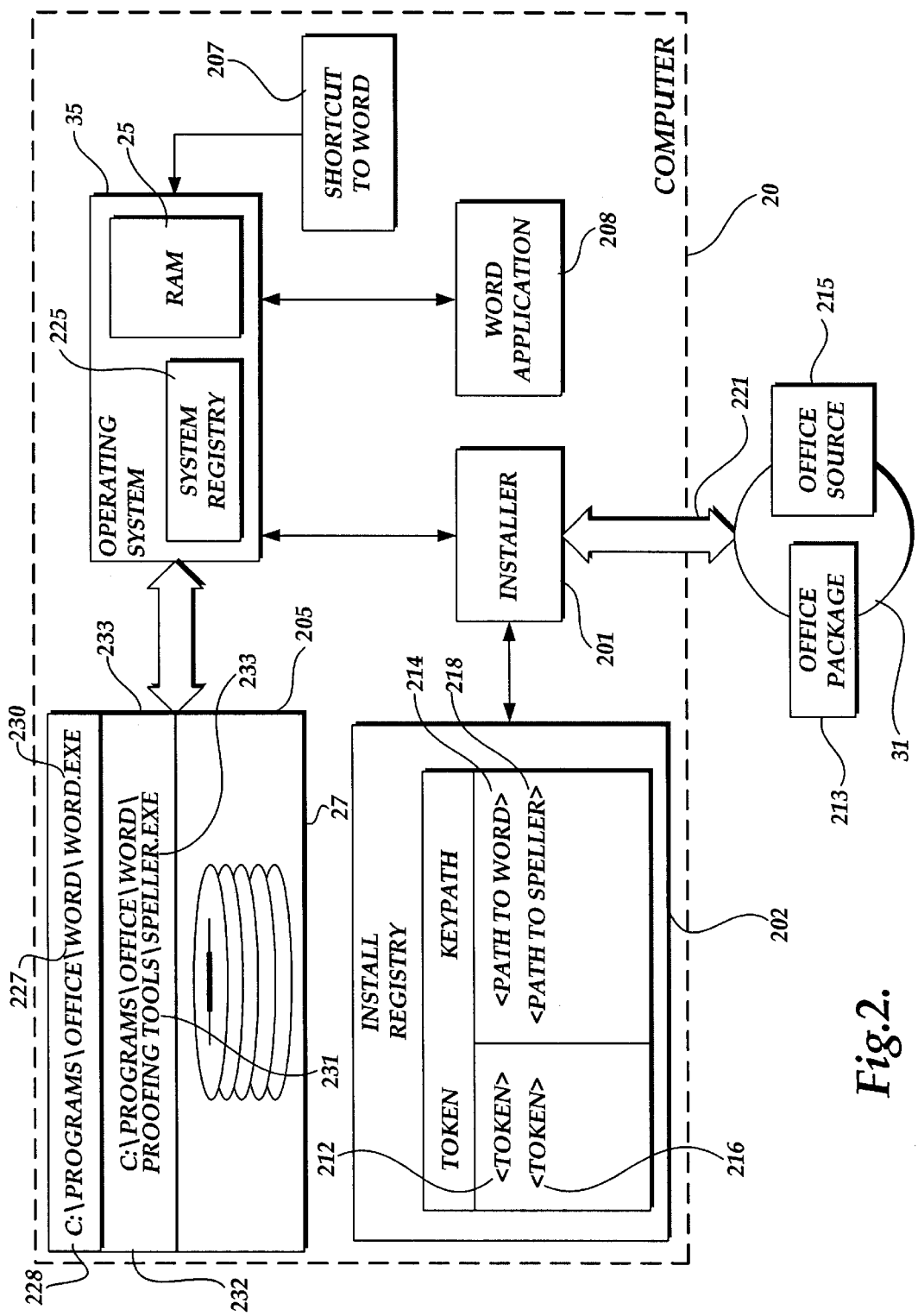
FIG. 2 is a more-detailed functional block diagram of an environment in which an exemplary embodiment of the present invention may operate.

FIG. 2 is a functional block diagram of a computer environment making use of an installer application 201 constructed in accordance with an exemplary embodiment of the present invention. The installer application 201 is also described in co-pending application Ser. No. 09/158,125, entitled "Use of Relational Databases for Software Installation" which was filed on the same day and assigned to the same assignee as the present application and is incorporated by reference herein.

To begin the example illustrated in FIG. 2, a user initiates the installation of the product, such as the Microsoft Office application program. Initiating the installation may constitute the act of inserting a CD-ROM disk 31 in optical disk drive 30 and then activating or selecting the install command, or the act of executing a remote startup script over a network connection, or any other means of initiating the installation. Once the installation is initiated, the installer application 201 assumes control of processing.

The installer application 201 begins the installation by reading the package file 213 into memory, such as RAM 25. The package file 213 is unique to the product and is essentially a database that describes, among other things, the relationships between the features, components, and resources of the product. The package file 213 may include the unique identifiers assigned to each of the features and components of the product. Resources such as shortcuts and registry keys are fully described and in a sense "contained" in the package file 213.

The installer application 201 reads the package file 213 and uses the information stored within to determine the installation operations that must be performed for the product. For instance, the installer application 201 may display a dialog box, which presents the user with the option of selecting which features of the product to install. The user may be presented with the option of selecting a "Word" feature, an "Excel" feature, and a "Proofing Tools" feature. The user may then select which features to install to the computer 20. Once the user has selected the desired features of the product, the installer application 201 resolves those features into a listing of components to be installed.

The source 215 contains the actual files associated with the components. Those components making up the selected features are copied from the source 215 to an appropriate location on the computer 20, such as to a folder on the hard-disk drive 27 or to a system registry 225 maintained by the operating system 35. The phrase "reading the component" refers to reading the resources associated with the component. Likewise, the phrase "writing the component" refers to writing the resources associated with the component. However, for the sake of simplicity, as used herein references to "reading," "writing," or "copying" components will be understood to be interchangeable with performing those actions on the underlying resources.

The appropriate location for a component on the computer 20 may depend upon the type of resources associated with the component. For instance, if the component includes files, the component may be stored in the file system of the hard-disk drive 27. However, if the component includes registry keys, the component may be stored in the system registry 225. In addition, a component may include both files and registry keys, in which case files are stored in the file system of the hard-disk drive 27 and the registry keys are stored in the system registry 225. If the user identifies a particular location within the file system of the hard-disk drive 27 for a feature, then the installer application 201 will write the files of components associated with that feature to that particular location.

When a component is written to the appropriate location, the installer application 201 creates an entry in an installer registry 202 corresponding to the component. The entry includes an identifier for the component, termed a "token," and a keypath for the component. The token includes the Product Code of the product installing the component, the feature identifier of the feature containing the component, and the Component Code of the component. A usage counter may be included to identify the number of products requiring a component so that, for example, if more than one product requiring a component is installed, the usage counter may prevent the component from being deleted if only one such product is uninstalled.

The keypath entry is a path in the file system where the component is actually stored. For instance, in the disclosed example, the product installed includes a "Word Feature" 227 having a "Word Executable Component" 228. The Word Executable Component 228 includes the key file "word.exe" 230. The Word Feature 227 also includes a "Proofing Tools Feature" 231, which is itself a feature. The Proofing Tools Feature 231 includes a "Spelling Component" 232, which includes the key file "speller.exe" 233.

The Word Executable Component 228 may be installed to the location on the hard-disk drive 27 identified by the path "C: \Programs\Office\Word\." Accordingly, the word.exe 230 key file is written to that location, and an entry in the installer registry 202 includes a token 212 identifying the Word Executable Component 228 and the keypath 214 to the word.exe 230 key file. In similar manner, the Spelling Component 232 may be written to the path "C:\Programs\Office\Word\Proofing_Tools\," and an entry in the installer registry 202 may be created with a token 216 identifying the Spelling Component 232 and a keypath 218 to the key file speller.exe 233.

The installer application 201 continues with the installation process until all of the components making up the selected features are written to the appropriate location on the hard disk drive 50. When all of the components are written, installation is complete, and the installer registry 202 is populated with an entry for each installed component. Each entry includes an identifier for the component (the token) and a keypath identifying the location to which the component is stored. The installer application may also include other entries, such as entries for components which are "advertised" for later installation.

Also during installation, a shortcut 207 to the Word Executable Component 228 is created. The shortcut 207 is an operating system 35 service which allows indirect access to a resource stored on the hard-disk drive 27. A shortcut is sometimes referred to as an "alias." The shortcut 207 is generally presented to the user as an icon or file which, when activated, launches an executable file associated with the shortcut 207. In the disclosed example, the shortcut 207 is associated with the Word Executable Component 228 such that activating the shortcut 207 causes the operating system 203 to launch the key file associated with the Word Executable Component 228, in this case the word.exe 230 executable file.

The installer application 201, as explained above, functions properly provided the installer application 201 can find the source file that it needs. Problems arise if the source file is not where the installer application 201 expects to find it. For example, if the installer application 201 is looking for a source file on a CD-ROM disk and the user is trying to install from the network or if the user tries to install from the network and the network goes down, the installation will fail. The installation cannot proceed until an alternate location of the necessary software components is found. A source list is a list of alternate locations of the software components to be installed.

The source list is only used today in the case where an application has already been partially or completely installed, and a subsequent install is later invoked on that product that requires source files. When this subsequent install is invoked, the user is not really installing from any one place. Therefore, the source list is searched, and the first valid source found is used for the install. For example, if the network is down, the original source is not available. Likewise if the user originally installed from CD, and the CD is not in the CD-ROM drive, then the source list can be used to find alternate source locations.

Searching the Source List

Figure 3:
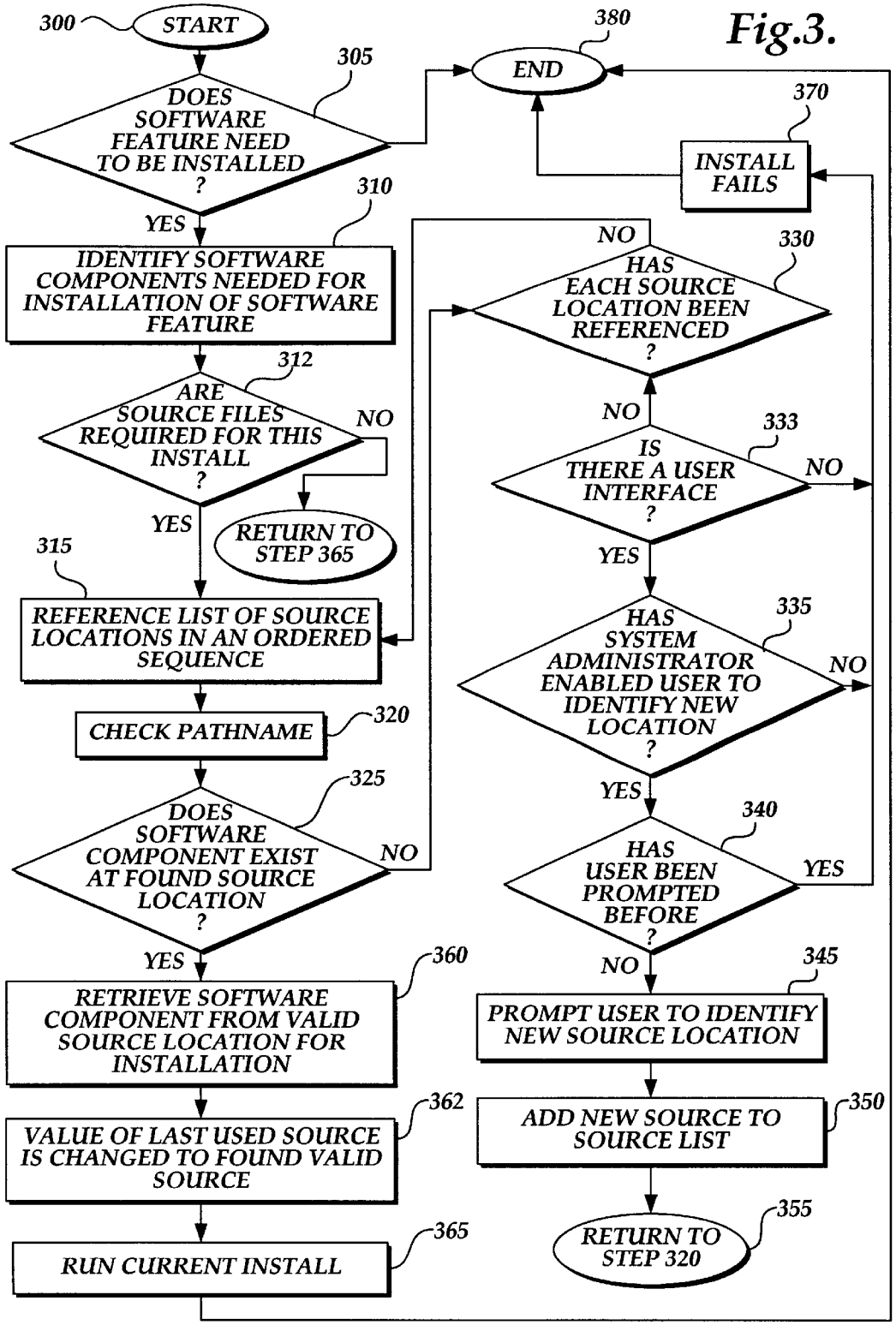
FIG. 3 is a flow diagram depicting steps performed by an exemplary embodiment of the present invention to search a source list for the source location of a software component to be installed.

FIG. 3 illustrates an overview of the steps involved for searching the source list in user application 201. The user begins at START step 300 by turning on computer 20. In step 305, based on the user's input, installer application 201 determines if a software feature needs to be installed. If no feature needs to be installed, this process ends in step 380. If a feature needs to be installed, in step 310, installer application 201 then identifies the software components needed for installation of the software feature. After identifying the software components needed for installation of the software feature, in step 312, the installer application determines if source files are required for this install. If source files are not required, the install fails in step 370, and the process ends in step 380. If source files are required for the install, in step 315, installer application 201 refers to a list of source locations in an ordered sequence according to source type. The last-used source is always checked first; however, a user can specify which sources are to be searched next and in what order. The default search order is last-used source and then network, media, and URL sources. The last-used source, the list of network sources, the list of media volume labels, and the list of URL sources, are each stored in separate registry keys. Though there is a list of media source locations, it is really a list containing entries for media volume labels because in actuality, there is only one media source location. There is never more than a single true media source in the list of media source locations because it is assumed to be only one form (CD or otherwise) of source media, and all instances of such media are identical. In step 320, installer application 201 checks the pathname. In step 325, installer application 201 checks the source for validity, meaning the existence of the package file is checked. Note, however, for media sources, the installer application merely verifies that the volume label is correct. If the component exists at this source location, in step 360, installer application 201 retrieves the necessary source files from this valid source location for installation. The value of the last-used source on the source list is changed to the found valid source in step 362 and the process ends in step 380. But if a valid source does not exist at this source location, in step 330, installer application 201 determines if each source location on the source list has been referenced. If not, steps 315, 320 and 325 are repeated. Otherwise, if there is a user interface in step 333, installer application 201 determines if the system administrator has enabled the user to identify new source locations in step 335. If the user interface level of the install is set to none in step 333, the install fails in step 370 because no source dialog is displayed to prompt the user to identify a new source location. If the user is unable to identify new source locations, the install fails in step 370, and the process ends in step 380. If, in step 335, the user is able to identify new source locations, and if the user has not been previously been prompted in step 340, then installer application 201 prompts the user to identify a new source location in step 345, adds the new source to the source list in step 350 and returns to step 320. The pathname is checked in step 320, and the installation process proceeds from step 320 to again attempt to retrieve the software component from a valid source location for installation. The process ends in step 380.

Adding Source Locations to the Source List

Figure 4:
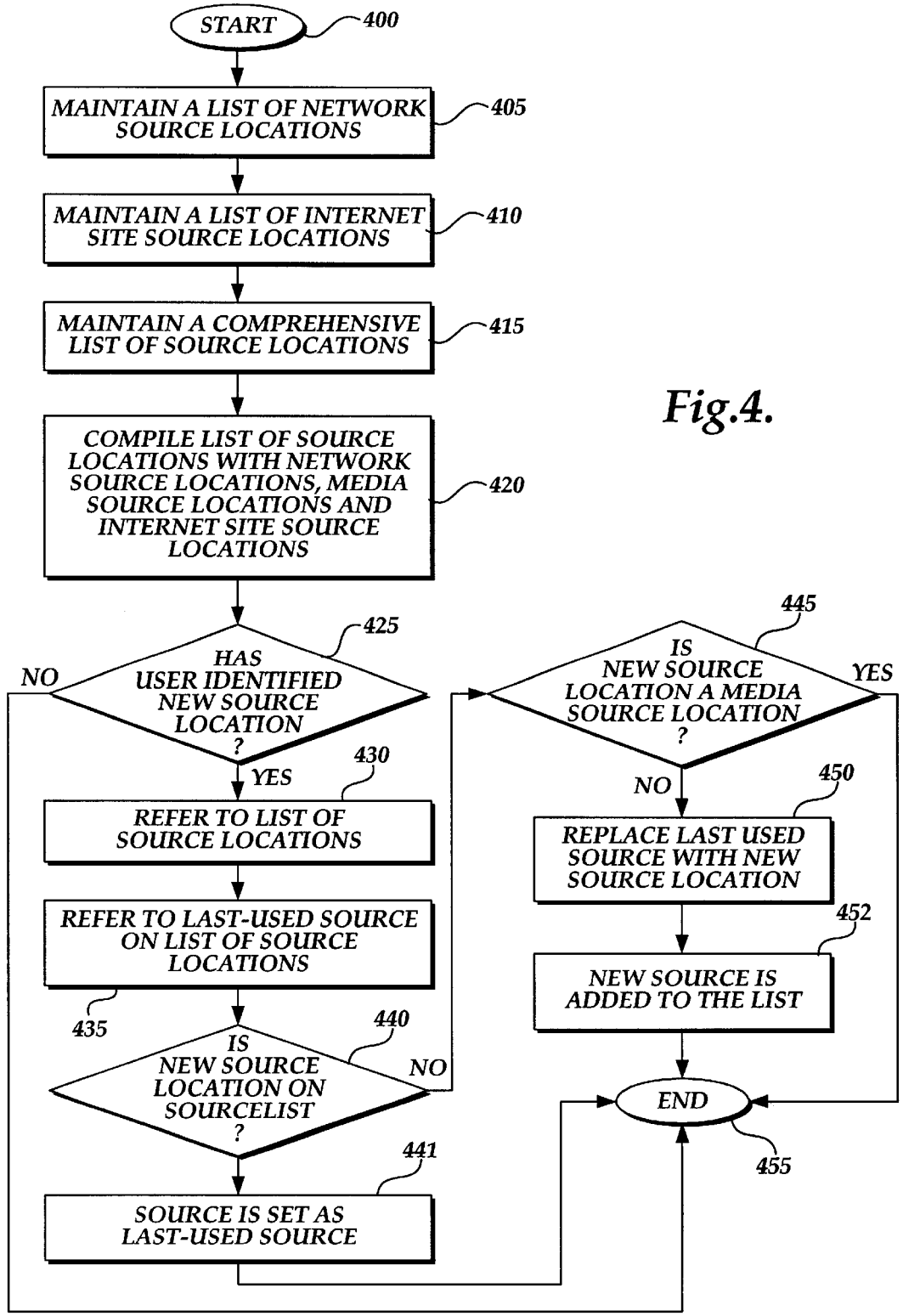
FIG. 4 is a flow diagram depicting steps performed by an exemplary embodiment of the present invention to add a new source location to a source list.

FIG. 4 illustrates an overview of the steps involved for maintaining the source list in installer application 201. The user beings at START step 400 by turning on the computer 20. From the very beginning, at the time the installer application is installed, there is already an existing source list to be maintained because there is at least one source— the source of the already installed installer application 201. In step 405, a list of network sources is maintained by user application 201. In step 410, a list of Internet site source locations is maintained by installer application 201. These lists are used to maintain a comprehensive list of source locations in step 415. In step 420, the list of source locations is categorized by installer application 201 by network source locations, media source locations and Internet site source locations. After compiling the list of source locations in step 420, the installer application 201 determines whether the user has identified a new source location. If not, the process ends in step 455. If so, in step 430, installer application 201 refers to its comprehensive list of source locations. In step 435, installer application 201 refers to the last-used source on its comprehensive list of source locations. In step 440, installer application 201 determines if the source location identified by the user is already on the list of source locations. If so, in step 441, the source is set as the last-used source, and then the process ends in step 455. If not, installer application determines whether the new source location is a media source location in step 445. If the new source location is not a media source location, in step 450, installer application replaces the last-used source with the new source location. The new source is then added to the list in step 452. The process ends in step 455. If the new source location is a media source location, the process ends in step 455.

Software Configured to "Run From Source"

The examples set forth above illustrate the process of using, maintaining, and supplementing a source list in the context of an installation procedure. However, the described method of using, maintaining, and supplementing a source list can also be adapted for application programs in which features are configured to run from source, rather than being installed onto the user's local hard disk drive. In this instance if a feature is configured to run from source and the original source location is unavailable, a source list can be used to attempt to locate an alternate valid source for the feature. As in the examples set forth above, the application can refer to a source list to identify an alternate valid source location for the needed feature in the event the original source location is unavailable. The feature is then run from the alternate source. Optionally the source list can be maintained, updated, and supplemented to change the primary source location or to add new source locations. In effect, this implementation is almost identical to the use of a source list for installing software, except that whereas an application program reads the code from the source location and copies some or all of the code onto the user's local hard disk drive, an application configured to run features from source will read the code from the source location and execute the code.

Finally, it will be understood that the preferred embodiment has been disclosed by way of example, and that other modifications may occur to those skilled in the art without departing from the scope and spirit of the appended claims.

What is claimed is:

1. In a computer system, a method of reading a computer program file, comprising the steps of:

looking for a predetermined computer program file in a first source location;

if the computer program file is not found in the first source location, or if the first source location cannot be found, repeatedly referencing a list of alternate source locations of the computer program file and looking for the computer program file in each of the alternate source locations on the list in turn until either the computer program file is found or until each source location on the list has been referenced; and if the computer program file is found, reading the computer program file from the corresponding source location.

2. The method of claim 1, comprising the further step, after said step of reading the computer program file, of copying at least a portion of the computer program file to a computer readable medium.

3. The method of claim 1, comprising the further step, after said step of reading the computer program file, of executing the computer program file.

4. The method of claim 1, comprising the further step, if the computer program file has not been found after all source locations on the list have been referenced, of prompting a user to identify a new source location.

5. The method of claim 1, wherein the referenced list of source locations of the computer program file is searched in a predetermined sequence.

6. The method of claim 5, wherein the predetermined sequence is configurable.

7. The method of claim 6, wherein the predetermined sequence is such that network source locations, media source locations, and Internet site source locations are categorized into different groups and are ordered within each group.

8. A computer-readable medium having computer-executable instructions to read a computer program file by performing steps comprising:

looking for a predetermined computer program file in a first source location;

if the computer program file is not found in the first source location, or if the first source location cannot be found, repeatedly referencing a list of alternate source locations of the computer program file and looking for the computer program file in each of the alternate source locations on the list in turn until either the computer program file is found or until each source location on the list has been referenced; and if the computer program file is found, reading the computer program file from the corresponding source location.

9. The computer-readable medium of claim 8, wherein the computer-executable instructions for performing the steps comprise the further step, after said step of reading the computer program file, of copying at least a portion of the computer program file to a computer readable medium.

10. The computer-readable medium of claim 8, wherein the computer-executable instructions for performing the steps comprise the further step, after said step of reading the computer program file, of executing the computer program file.

11. The computer-readable medium of claim 8, wherein the computer-executable instructions for performing the steps comprise the further step, if the computer program file has not been found after all source locations on the list have been referenced, of prompting a user to identify a new source location.

12. The computer-readable medium of claim 8, wherein the referenced list of source locations of the computer program file is searched in a predetermined sequence.

13. The computer-readable medium of claim 12, wherein the predetermined sequence is configurable.

14. The method of claim 13, wherein the predetermined sequence is such that network source locations, media source locations, and Internet site source locations are categorized into different groups and are ordered within each group.

15. A computer system which carries out a method for reading a computer program file, comprising the steps of:

looking for a predetermined computer program file in a first source location;

if the computer program file is not found in the first source location, or if the first source location cannot be found, repeatedly referencing a list of alternate source locations of the computer program file and looking for the computer program file in each of the alternate source locations on the list in turn until either the computer program file is found or until each source location on the list has been referenced; and if the computer program file is found, reading the computer program file from the corresponding source location.

16. The computer system of claim 15, wherein the method comprises the further step, after said step of reading the computer program file, of copying at least a portion of the computer program file to a computer readable medium.

17. The computer system of claim 15, wherein the method comprises the further step, after said step of reading the computer program file, of executing the computer program file.

18. The computer system of claim 15, wherein the method comprises the further step, if the computer program file has not been found after all source locations on the list have been referenced, of prompting a user to identify a new source location.

19. The computer system of claim 15, wherein the referenced list of source locations of the computer program file is searched in a predetermined sequence.

20. The computer system of claim 19, wherein the predetermined sequence is configurable.

21. The computer system of claim 20, wherein the predetermined sequence is such that network source locations, media source locations, and Internet site source locations are categorized into different groups and are ordered within each group.

* * * * *